United States Patent [19]
Aspinwall

[11] 3,828,409
[45] Aug. 13, 1974

[54] REVERSIBLY MOUNTABLE BOOK CUTTER

[75] Inventor: Peter Aspinwall, Carlisle, Mass.

[73] Assignee: Comstock & Wescott, Inc., Cambridge, Mass.

[22] Filed: Apr. 23, 1973

[21] Appl. No.: 353,460

[52] U.S. Cl. ............................... 29/105 A, 11/1 ET
[51] Int. Cl. .............................................. B26d 1/12
[58] Field of Search........ 29/105 A, 105 R; 11/1 ET, 11/1 AD; 144/223, 235

[56] References Cited
UNITED STATES PATENTS
1,125,537  1/1915  Hoover ............................. 29/105 A
3,188,667  6/1965  Blair ................................. 11/1 ET FOREIGN PATENTS OR APPLICATIONS
880,838  6/1953  Germany ........................ 29/105 A
543,949  5/1956  Italy ................................. 29/105 A

*Primary Examiner*—Leonidas Vlachos
*Attorney, Agent, or Firm*—James H. Grover

[57] ABSTRACT

A cutting wheel for trimming the edge of a book has cutting bits of isosceles triangular cross section brazed in triangular notches around the periphery of the wheel. Each bit has cutting edges of two sets extending beyond both faces of the wheel, and the wheel has a mounting hub permitting the wheel to be reversibly mounted on a drive shaft to use one set of cutting edges when the other set on the same bits is dulled.

8 Claims, 8 Drawing Figures

PATENTED AUG 13 1974  3,828,409
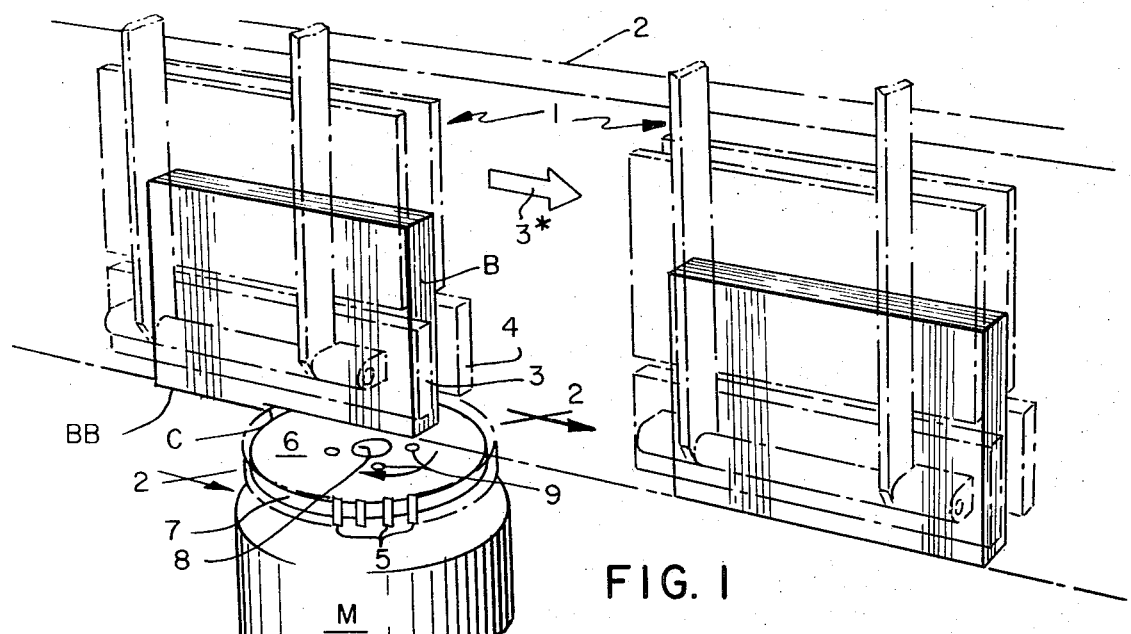
FIG. 1
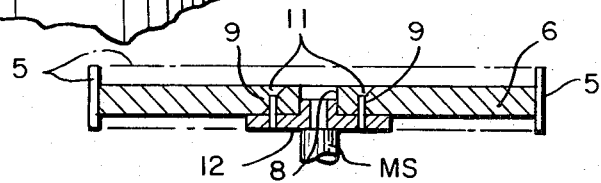
FIG. 2
FIG.3
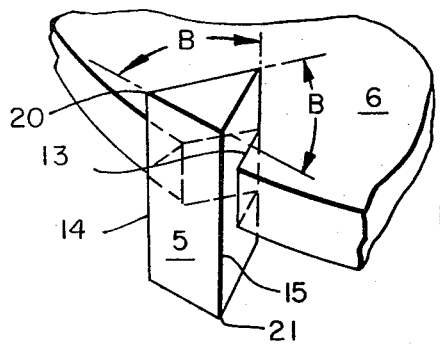
FIG.4
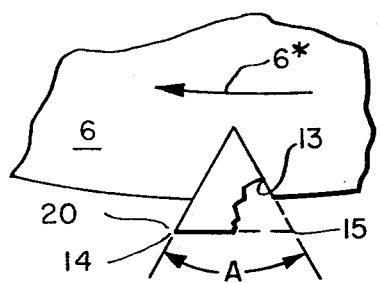
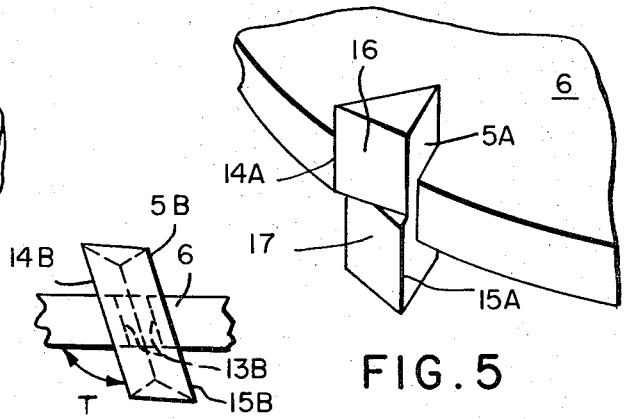
FIG.7
FIG.5
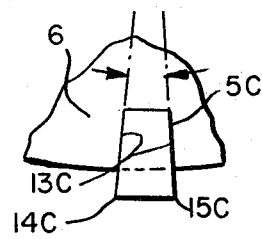
FIG.8
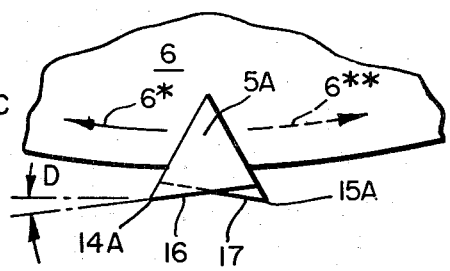
FIG.6

3,828,409

REVERSIBLY MOUNTABLE BOOK CUTTER

BACKGROUND OF THE INVENTION

Precision cutters best suited for trimming the backbone of a collated book prior to applying adhesive binder thereto now consist of a carrier disk or wheel with tungsten carbide insert bits secured to one face of the wheel. Carbide bits maintain their cutting edge many times longer than steel teeth and provide quality cutting and long trouble free services. However, the bits themselves and welding, brazing or similarly bonding them to, or mechanically mounting them on, the wheel add considerably to the cost of the cutter.

Accordingly the object of the present invention is to provide a book cutting wheel with cutting bits bonded thereto which is greatly reduced in cost.

STATEMENT OF INVENTION

According to the invention a book cutter comprises a rotary carrier disk including means for mounting the disk on a shaft, said mounting means being substantially identical at both disk faces, the disk having a plurality of circularly spaced sockets, and a plurality of cutting bits respectively mounted in the sockets, each bit having cutting edges respectively extending axially beyond the two disk faces, and the respective cutting edges of each bit being directed oppositely, whereby when the cutting edges at one side of the disk are dulled the disk may be inversely mounted for use of the other cutting edges of the same bits.

DRAWING

FIG. 1 is an isometric view of book cutting apparatus employing a cutting wheel with bits according to one form of the invention;

FIG. 2 is a sectional view on lines 2—2 of FIG. 1, enlarged;

FIGS. 3 and 4 are enlarged fragmentary isometric and plan views of the wheel of FIG. 1;

FIGS. 5 and 6 are views like FIGS. 3 and 4 of an alternative form of wheel;

FIG. 7 is an enlarged side elevation of a fragment of wheel with another form of bit; and FIG. 8 is an enlarged plan view of a fragment of wheel with still another form of bit.

DESCRIPTION

FIG. 1 shows a part of book cutting apparatus with two book carriers 1 carried on a conveyor 2 indicated as a dot-dashed line. Each book carrier comprises fixed and movable clamps 3 and 4 between which the collated signatures of an unbound book B are securely gripped. The backbone BB of the book extends below the clamps 3 and 4 where a cutting wheel 6 driven by a motor M trims a cut C as the book carrier is conveyed in the direction of the arrow 3*. The cutting wheel 6 consists of a disk 7 with 30 or so cutting bits or inserts 5 around the periphery of the disk. An axial mounting hole 8 and bolt holes 9, identically countersunk at both faces of the disk, are provided for mounting the disk on the shaft of the motor M.

As shown in FIG. 2 the disk 6 is mounted on the motor shaft MS by stove bolts 11 through the disk 6 and into holes threaded in a hub 12 which extends into the axial hole 8 of the disk. Because the axial hole is the same in diameter at both faces and the bolt holes 9 are identically countersunk at both faces of the disk 6 the hub 12 may be secured at either face of the disk with the bolt heads flush with the face.

Formed around the peripheral edge of the disk are equally spaced sockets 13 in which the cutting bits 5 are welded or brazed. One form of tungsten carbide bit shown in FIGS. 3 and 4 is of triangular prism shape having a triangular cross section parallel to the plane of the disk. The cross section is preferably that of an equilateral triangle, but may have greater or lesser included angles B between approximately 30° and up to or greater than 90°, the lower angle being limited by the requirement of sufficient bit thickness for cutting strength, and the higher angle being limited by the requirement that the bit be of sufficient sharpness for the cutting for which it is designed. For angles B approaching and exceeding 90°, the bit shape will become four-sided (FIG. 8) rather than three-sided, and a negative rather than positive hook will be achieved. In fact, bits of almost any configuration may be used provided that the geometry of the cutting edges 14 and 15 (FIG. 3) or 14C and 15C (FIG. 8) are the same and proper for the material being cut. The preferred shape is that of an isosceles triangle, which is bilaterally symmetrical and is the flat sided figure with the least number of faces (five) that must be formed in the carbide and the least number (two) of faces to be machined to provide a socket 13 for each bit in the disk.

In addition, this shape provides the maximum dimension of the very strong carbide directly behind the cutting point 20 and 21 for an angle B of 60° or less. After bonding in the disk sockets 13 the bits are circularly or flat ground to provide two cutting edges 14 and 15 directed oppositely with respect to one rotational direction 6* of the disk 6. Both cutting edges 14 and 15 extend parallel to the vertical axis of the disk beyond both of the two disk faces. As shown in FIGS. 1 to 4 the upper end of the cutting edge 14 is used in making the cut C in the book backbone BB.

According to the invention, when the cutting edges 14 become dull or otherwise deteriorate, the wheel 6 is reversed or inverted and remounted with the cutting edges 15 of the same presented at its top face for use in cutting, the identically terminated mounting holes 8 and 9 permitting the reversal. Since the simultaneous sharpening of two available cutting edges of the bits above and below the disk represents a negligible proportion of the cost of the cutting wheel its life is virtually double that of prior book cutting wheels with single edged disks. The present wheel has the further advantage that, with the doubling of life, the bits may be bonded to the disk by welding or brazing as compared with bits which are replaceably mounted. Even with replaceable, mechanically mounted bits the cost in down time and labor to reverse the disk is far less than reversing two to five dozen bits.

The above advantages are also present in the bits shown in FIGS. 5 and 6, wherein after a bit 5A is bonded to the disk 6, two outer faces 16 and 17 are flat ground to provide upper and lower, oppositely directed cutting edges 14A and 15A, each with a clearance angle D.

The bits may also be inclined with respect to the plane of the disk. As shown in FIG. 7 the bit 5B is inclined at an angle T providing a cross rake to both cutting edges 14B and 15B. The angle T is from 75° to 85°, preferably 80°. The upper and lower ends of the bit have clearance rearwardly and radially inwardly from the respective cutting edges. The disk socket 13B for each bit has two faces inclined at the angle T to the plane of the disk, that is, inclined circumferentially away from a normal to the plane of the disk.

It should be understood that the present disclosure is for the purpose of illustration only and that this invention includes all modifications and equivalents which fall within the scope of the appended claims.

I claim:

1. A book cutter comprising:
   a rotary carrier disk including means for mounting the disk on a shaft, said mounting means being substantially identical at both disk faces, the disk having a plurality of circularly spaced sockets, and
   a plurality of cutting bits respectively mounted in the sockets, each bit having cutting edges respectively extending axially beyond the two disk faces, the respective cutting edges of each bit being directed oppositely, and each bit being triangular in cross section parallel to the plane of the disk,
   whereby when the cutting edges at one side of the disk are dulled the disk may be inversely mounted for use of the other cutting edges of the same bits.

2. A book cutter according to claim 1 wherein the bits are bonded to the disk and are alternatively useful by inversion of the wheel only.

3. A book cutter according to claim 1 wherein each bit has two end faces and three longitudinal faces.

4. A book cutter according to claim 1 wherein each bit has an isosceles triangular cross section normal to its cutting edges.

5. A book cutter according to claim 4 wherein the cross section is equilateral.

6. A book cutter according to claim 1 wherein each bit has an outer plane surface inclined inwardly of the disk from each cutting edge.

7. A book cutter according to claim 1 wherein each bit is defined by three or more plane surfaces longitudinally of a bit axis and bilaterally symmetrical about the axis.

8. A book cutter according to claim 1 wherein each disk socket and bit is inclined circumferentially away from a normal to the plane of the disk.

* * * * *